UNITED STATES PATENT OFFICE.

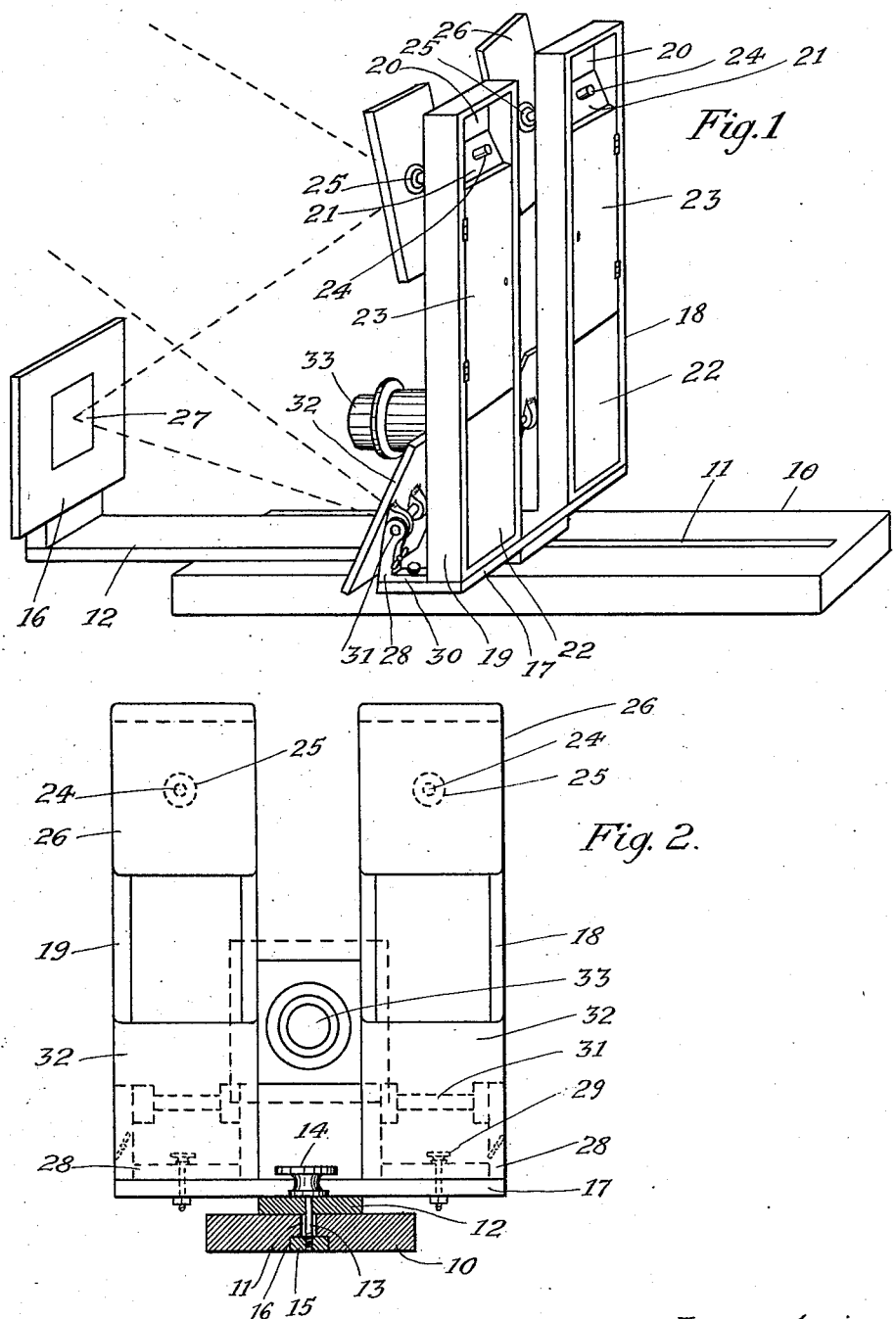
F. T. WILSON.
MACHINE FOR PROJECTING PICTURES BY SUNLIGHT.
APPLICATION FILED AUG. 2, 1912.
1,065,757. Patented June 24, 1913.

FRANK T. WILSON, OF STILLWATER, MINNESOTA.

MACHINE FOR PROJECTING PICTURES BY SUNLIGHT.

1,065,757. Specification of Letters Patent. Patented June 24, 1913.

Application filed August 2, 1912. Serial No. 712,902.

*To all whom it may concern:*

Be it known that I, FRANK T. WILSON, a citizen of the United States, residing at Stillwater, in the county of Washington and State of Minnesota, have invented certain new and useful Improvements in Machines for Projecting Pictures by Sunlight, of which the following is a specification.

My invention relates to machines for projecting pictures by means of sunlight, and has for its object to provide a convenient, easily constructed and simply operative device designed to be set in a window and having a plurality of adjustable reflecting surfaces which direct sunlight upon the picture from above and below the same, together with suitable lenses for receiving and projecting the image of the picture upon a screen within a room.

The full objects and advantages of my invention will appear in connection with the detailed description thereof and are particularly pointed out in the claims.

In the drawings, illustrating the application of my invention in one form,—Figure 1 is a perspective view of a projectiscope embodying the principles of my invention. Fig. 2 is an end elevation partly in section viewed from the front of the machine.

A platform or table 10 is provided which may be simply an ordinary plank having a groove or slot 11 through the center thereof. Upon the top of the platform 10 is a slide 12 having a bead 13 adapted to enter the slot 11, and a thumb-screw 14 may pass through slide 12 and engage a member 15 slidable in a groove or way 16 in the bottom of the platform 10 by means of which the slide 12 may be fixed in any desired adjusted position on platform 10.

Secured to the outer end of slide 12 is a rack 16 for receiving and holding a postcard or other picture which it is desired to project. Secured to the other end of slide 12 is a cross bar 17. Upon the cross bar 17 at either end thereof and symmetrically disposed with respect to slide 12 and platform 10 is a pair of upright frames 18 and 19. The upper part of each of these frames is closed by a short depending partition 20 at the front of each of the frames and an angularly disposed transverse member 21 joining and below the partition 20. The lower part of each frame is closed by a fixed partition 22 at the back of the frames and the space between the angular member 21 and the partition 20 is closed by a door 23 hinged to the side of the frame and adapted to be swung outwardly thereon.

Extending through the angular members 21 and at right angles to the plane thereof so as to have a swiveling movement thereon are spindles 24 and secured upon the ends of said spindles by means of ball and socket joints 25 are plane surfaced mirrors 26, these mirrors therefore being capable of any desired adjustment to catch and reflect beams of sunlight upon the picture 27 in the frame 16.

The cross bar 17 projects forwardly of the frames 18 and 19, and secured upon such forwardly projecting portion in alinement with the frames 18 and 19 and the mirrors 26 are brackets 28, said brackets being held in a swiveling position upon the cross bar 17 by means of thumb screws 29 passing through a base 30 integrally formed upon said brackets. Pivotally mounted upon a spindle 31 for oscillation in a horizontal plane upon the brackets 28 are mirrors 32. The mirrors 32 therefore are capable of any necessary adjustment in vertical and horizontal planes to reflect beams of light upon picture 27 from below the plane thereof, said reflected beams and those from mirrors 26 passing through a projecting lens 33 which extends backward between the frame members 18 and 19.

In practice, the space between frame members 18 and 19, with the exception of a passageway from the lens 33, will be closed by means of cloth or by other means. When the apparatus is set in the window the window shade will be drawn down upon the top of the apparatus, and if the frames 18 and 19 do not entirely fill the space within the window opening, said open spaces at either side and said frames may be closed by black cloths or otherwise. In this position the front of the apparatus, or that part upon which is the picture holder 16, will be extended outside of the window. Through the doors 23 the operator will be able to adjust the mirrors 26 and 32 so as to throw upon the picture 27 on the holder four beams of light, two from above, and two from below, these four beams also being thrown two from each side, thus distributing the light upon the picture in the most uniform and effective manner. If it is desired to draw the apparatus back within the window to put in new pictures or for any other purpose, it can readily be done by merely loosening the thumb screw 14.

It is to be noted that the adjustability of slide 12 on table 10 adapts the apparatus to be used conveniently in connection with windows where the adjacent walls may vary materially in thickness. The curtaining will usually be effected adjacent the plane of the sash. The stand 10 will preferably be set upon a table within the room. An adjustment of the frames 18 and 19 into the plane of the curtains is then effected by sliding of member 12 upon the stand 10 which can be accomplished much more conveniently and effectively than if it were necessary to slide the stand upon the table to accomplish this adjustment. Moreover, the table 10 may itself be provided with legs, if so desired, in which case a separate table will be entirely dispensed with. The positioning of the table 10 will always be made so as to direct the lens 33 properly for projecting upon the screen within the room; usually the table 10 should be set as nearly as possible perfectly level. The adjustment of the slide 12 upon the table 10 is then effected for the purpose of getting the mirrors into position to catch the sunlight most effectively and the frames 18 and 19 into the plane of the window curtaining or screening material.

I claim:

1. A solar illuminator comprising a table, a slide adjustably mounted on said table, means for holding a picture positioned for illumination at the end of the slide, and a plurality of mirrors carried upon said slide at a fixed distance and having the planes thereof adjustable to throw beams of sunlight upon the picture, some of said beams to be thrown from above and some from below the horizontal limits of the picture.

2. A solar illuminator comprising a table, a slide adjustably mounted on said table, means for holding a picture positioned for illumination at the end of the slide, a cross bar on the slide, and a plurality of mirrors mounted directly upon said cross bar to oscillate on horizontal and vertical axes each to throw a separate beam of sunlight upon the picture from below the horizontal limits thereof.

3. A solar illuminator comprising a table, a slide adjustably mounted on said table, means for holding a picture positioned for illumination at the end of the slide, a cross bar on the slide, a plurality of mirrors mounted directly upon said cross bar to oscillate on horizontal and vertical axes each to throw a separate beam of sunlight upon the picture from below the horizontal limits thereof, uprights carried by said cross bar, and a mirror mounted on each of said uprights and adjustable in horizontal and vertical planes each to throw a separate beam of sunlight upon the picture from above the horizontal limits thereof.

4. A solar illuminator comprising a table, a slide adjustably mounted on said table, means for holding a picture positioned for illumination at the end of the slide, a cross bar on the slide, a plurality of mirrors mounted directly upon said cross bar to oscillate on horizontal and vertical axes each to throw a separate beam of sunlight upon the picture from below the horizontal limits thereof, uprights carried by said cross bar and spaced apart thereon, a projecting lens in horizontal alinement with the picture and positioned to project the same between the said uprights, and a mirror mounted on each of said uprights and adjustable in horizontal and vertical planes each to throw a separate beam of sunlight upon the picture from above the horizontal limits thereof.

5. A solar illuminator comprising a table, a slide adjustably mounted on said table, means for holding a picture positioned for illumination at the end of the slide, a cross bar on the slide, a plurality of mirrors mounted directly upon said cross bar to oscillate on horizontal and vertical axes each to throw a separate beam of sunlight upon the picture from below the horizontal limits thereof, uprights carried by said cross bar and spaced apart thereon, a projecting lens in horizontal alinement with the picture and positioned to project the same between the said uprights, a mirror mounted on each of said uprights and adjustable in horizontal and vertical planes each to throw a separate beam of sunlight upon the picture from above the horizontal limits thereof, said uprights comprising frame members and doors opening from the back thereof to permit access to all of said mirrors, said picture and said projecting lens.

In testimony whereof I affix my signature in presence of two witnesses.

FRANK T. WILSON.

Witnesses:
H. A. BOWMAN,
F. A. WHITELEY.